United States Patent
Reed

(10) Patent No.: US 9,209,914 B2
(45) Date of Patent: *Dec. 8, 2015

(54) METHOD AND APPARATUS FOR VIRTUAL DESKTOP OTA

(71) Applicant: Spirent Communications, Inc., Sunnyvale, CA (US)

(72) Inventor: John Douglas Reed, Arlington, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,191

(22) Filed: Jun. 20, 2014

(65) Prior Publication Data

US 2014/0302798 A1    Oct. 9, 2014

Related U.S. Application Data

(63) Continuation of application No. 13/147,577, filed as application No. PCT/US2010/024202 on Feb. 13, 2010, now Pat. No. 8,761,684.

(60) Provisional application No. 61/152,650, filed on Feb. 13, 2009.

(51) Int. Cl.
| | |
|---|---|
| *H04B 17/00* | (2015.01) |
| *H04W 24/06* | (2009.01) |
| *H04B 17/391* | (2015.01) |

(52) U.S. Cl.
CPC .......... *H04B 17/009* (2013.01); *H04B 17/0085* (2013.01); *H04B 17/391* (2015.01); *H04W 24/06* (2013.01)

(58) Field of Classification Search
CPC ........................ H04B 17/0085; H04W 24/06
USPC ...................................................... 455/67.14
See application file for complete search history.

(56) References Cited

U.S. PATENT DOCUMENTS

| | | | |
|---|---|---|---|
| 7,224,941 B2 * | 5/2007 | Liu ............................. | 455/67.11 |
| 7,324,588 B2 * | 1/2008 | Green et al. .................. | 375/224 |
| 7,395,060 B2 * | 7/2008 | Liu .............................. | 455/423 |
| 7,398,056 B1 * | 7/2008 | Ebert et al. .................. | 455/67.14 |
| 8,761,684 B2 | 6/2014 | Reed | |
| 2005/0085223 A1 * | 4/2005 | Liu .............................. | 455/423 |
| 2006/0229018 A1 * | 10/2006 | Mlinarsky et al. .......... | 455/67.11 |
| 2006/0252419 A1 * | 11/2006 | Liu .............................. | 455/423 |
| 2007/0019769 A1 * | 1/2007 | Green et al. .................. | 375/360 |
| 2008/0056340 A1 * | 3/2008 | Foegelle ....................... | 375/224 |
| 2009/0094492 A1 * | 4/2009 | Music et al. .................. | 714/715 |

OTHER PUBLICATIONS

International Search Report of corresponding PCT Application No. PCT/US2010/024202, mailed Sep. 17, 2010, 4 pgs.

* cited by examiner

*Primary Examiner* — April G Gonzales

(74) *Attorney, Agent, or Firm* — Haynes Beffel & Wolfeld LLP

(57) ABSTRACT

The present invention relates to testing a mobile device in a lab by providing test signals to the mobile device via a cabled connection which bypasses the actual physical antennas in the mobile device. The test signals emulate a wireless channel and incorporate representative and/or actual measured characteristics of the performance of the antennas in the mobile device. As such, the performance mobile device can be accurately measured without requiring placement in an anechoic chamber, which enables efficient testing over a large set of configurations and underlying conditions.

31 Claims, 9 Drawing Sheets

| Path # | Path Amplitude | Angle of Arrival |
|---|---|---|
| Path 1 | $A_{Path1}$ | $\theta_{Path1}, \phi_{Path1}$ |
| Path 2 | $A_{Path2}$ | $\theta_{Path2}, \phi_{Path2}$ |
| ⋮ | ⋮ | ⋮ |
| Path N | $A_{PathN}$ | $\theta_{PathN}, \phi_{PathN}$ |

Fig. 7

| Angle | Antenna 1 | | Antenna 2 | | ... | Antenna J | |
|---|---|---|---|---|---|---|---|
| | Amplitude | Phase | Amplitude | Phase | | Amplitude | Phase |
| $\theta_1, \phi_1$ | $A_{1,1\_ANT1}$ | $P_{1,1\_ANT1}$ | $A_{1,1\_ANT2}$ | $P_{1,1\_ANT2}$ | | $A_{1,1\_ANTJ}$ | $P_{1,1\_ANTJ}$ |
| $\theta_2, \phi_2$ | $A_{2,2\_ANT1}$ | $P_{2,2\_ANT1}$ | $A_{2,2\_ANT2}$ | $P_{2,2\_ANT2}$ | | $A_{2,2\_ANTJ}$ | $P_{2,2\_ANTJ}$ |
| ... | ... | | ... | | | ... | |
| $\theta_M, \phi_M$ | $A_{M,M\_ANT1}$ | $A_{M,M\_ANT1}$ | $A_{M,M\_ANT2}$ | $A_{M,M\_ANT2}$ | | $A_{M,M\_ANTJ}$ | $A_{M,M\_ANTJ}$ |

METHOD AND APPARATUS FOR VIRTUAL DESKTOP OTA

RELATED APPLICATION

This application is a continuation of U.S. application Ser. No. 13/147,577, entitled, "METHOD AND APPARATUS FOR VIRTUAL DESKTOP OTA," filed on 29 Aug. 2011, which is a National Stage Entry of PCT/US2010/024202 entitled, "METHOD AND APPARATUS FOR VIRTUAL DESKTOP OTA," filed on 13 Feb. 2010, which claims priority to U.S. Non Provisional Application No. 61/152,650, entitled, "VIRTUAL DESKTOP OTA," filed on 13 Feb. 2009. This related and priority application is hereby incorporated by reference for all purposes.

BACKGROUND OF THE INVENTION

1. Field of the Invention

The present invention relates to testing mobile devices in a lab, and more particularly to techniques for testing mobile devices which incorporate characteristics of the antennas of the mobile device while bypassing the antennas.

2. Description of Related Art

When designing over-the-air (OTA) testing approaches, channel modeling concepts are applied in order to insure that the received signal is representative of the desired test condition. Most channel models such as the Spatial Channel Model (SCM) have been designed to be antenna independent, i.e. they are suitable for a variety of possible antenna arrangements. Thus the model provides a way to specify a stochastic geometric based spatio-temporal description of the paths between a base station (BS) and a mobile station (MS), such that the performance of the antennas of the base station and mobile station can be applied and modeled separately from the channel model. The base station and the mobile station will then make use of the paths in the channel model with their antenna characteristics to produce a complete end-to-end channel for evaluation and testing.

In order to include the antenna characteristics in a measurement of radio link performance using an Over-The-Air (OTA) testing techniques, it is necessary to generate and wirelessly transmit an accurate test signal such that the antennas of the device-under-test can act upon the received signal in a controlled way. For the purposes of testing, a signal to be received by the MS can be generated without requiring the BS to be present in the simulated path, or vice-versa. This is done by providing the proper signals to the transmitting and receiving elements of a portion of the channel that is being modeled. Thus a forward or reverse link transmission may be emulated.

However, generating the test signals for an over-the-air test is complex. There are multiple paths, and each path must be constructed to produce the proper correlation between antennas at the device-under-test. Thus many individual probes would typically be required to be located in a variety of positions within an anechoic chamber to produce an adequate test signal. Having many probes is costly and complex to implement. Furthermore, having many probes will degrade the characteristics of the chamber due to additional reflections that may be produced. This kind of testing is also time consuming, making it very difficult to do more than a limited set of configurations and underlying conditions.

SUMMARY

We disclose technology useful for testing a mobile device in a lab by providing test signals to the mobile device via a cabled connection which bypasses the actual physical antennas in the mobile device. The test signals emulate a wireless channel and incorporate representative and/or actual measured characteristics of the performance of the antennas in the mobile device. As such, the performance mobile device can be accurately measured without requiring placement in an anechoic chamber, which enables efficient testing over a large set of configurations and underlying conditions.

A system for testing a mobile device having a set of two or more antennas is described herein. The system includes a signal feed adapted to be coupled to the mobile device at a location that bypasses the set of two or more antennas. The system further includes memory storing representative radiation pattern data of individual antennas in the set, such as in a data structure. The memory also stores a propagation channel model representing amplitude and angle of arrival of one or more signal paths between a signal source and the mobile device. The system also includes a channel emulator coupled to the signal feed and the memory, the channel emulator comprising one or more processors and storing instructions executable by the processors. The channel emulator aligns the radiation pattern data of the individual antennas in the set with the signal paths in the propagation channel model using an angular orientation parameter that relates the radiation pattern data of individual antennas in the set to the angle of arrival of the respective signal paths. The channel emulator applies the aligned radiation pattern data of the individual antennas in the set to the signal paths in the propagation channel model to compute a propagation channel model, comprising modifying at least the amplitude of the individual signal paths with the aligned radiation pattern data of the individual antennas in the set at the angle of arrival of the individual signal paths. The channel emulator also generates a test signal to emulate a wireless channel between the signal source and the mobile device using the modified propagation channel model, and provides the test signal to the signal feed.

Other aspects and advantages of the present invention can be seen on review of the drawings, the detailed description, and the claims which follow.

BRIEF DESCRIPTION OF THE DRAWINGS

FIG. 7 is a table showing an example of the data structure for a propagation channel model stored in memory in the channel emulator.

DETAILED DESCRIPTION

A detailed description of embodiments of the present invention is provided with reference to the FIGS. 1-11.

Figure 1:
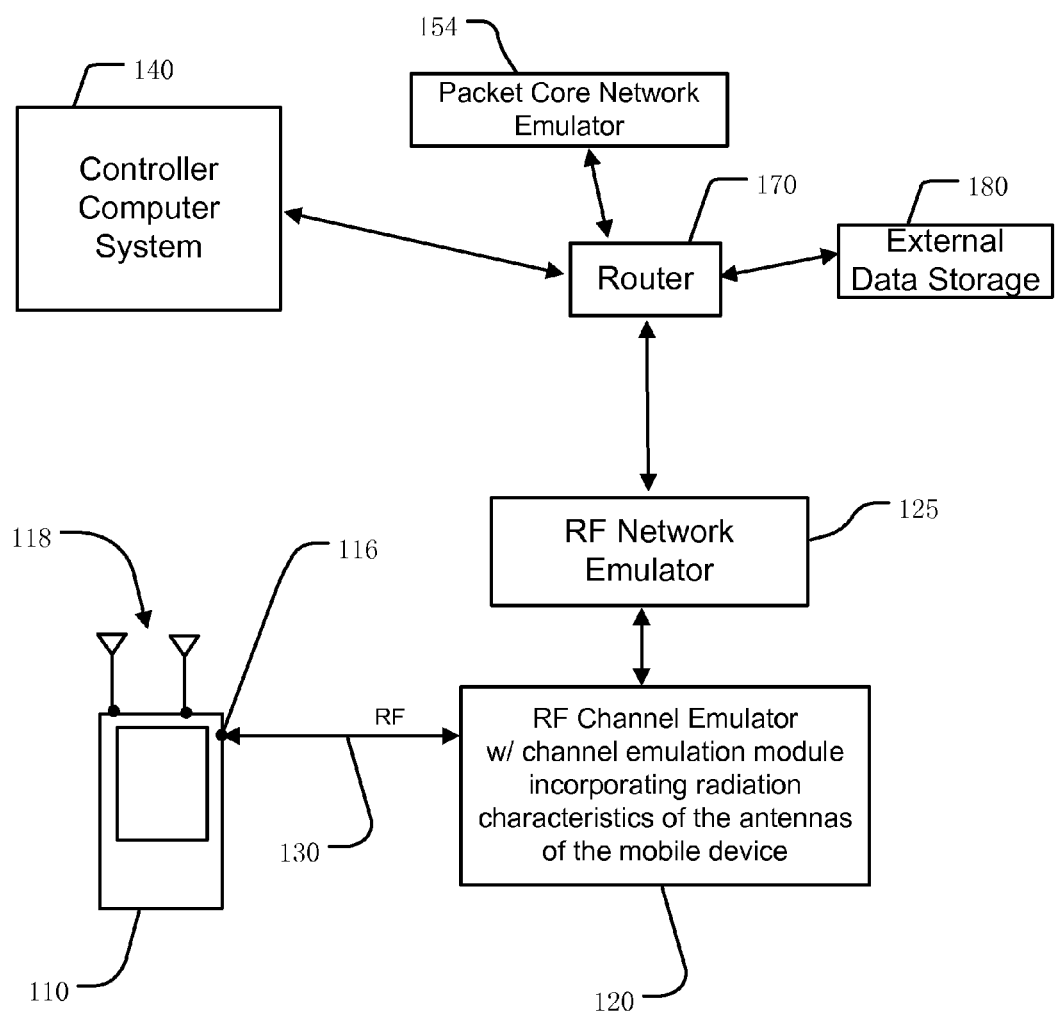
FIG. 1 is a simplified block diagram of a lab based system as described herein for evaluating the performance of a mobile device.

FIG. 1 is a simplified high-level block diagram of a lab based system 100 for evaluating the performance of a mobile device 110. As used herein, the term "mobile device" refers generally to any portable device that has wireless connectivity via a set of two or more antennas to at least one network, such as a cellular network and/or internet. The mobile device 110 may be a cellular telephone, PDA, laptop computer, or other device.

The mobile device 110 includes an RF port 116 coupled to a channel emulator 120 which delivers test signals to the mobile device 110 through a cabled connection 130, thus bypassing the actual physical antennas 118 of the mobile device 110. In FIG. 1 the mobile device 110 includes two antennas 118. More generally, the mobile device 110 may include two or more antennas.

The RF port 116 can be for example a small coaxial connector on the mobile device 110. Other types of RF ports may alternatively be used, depending upon the properties of the device 110. Other types of signal feeds may also be used for bypassing the antennas 118. For example, the test signals from the channel emulator 120 may be delivered through an antenna adaptor, which allows testing of the device by replacing the antennas 118 with the adaptor. The connection may also be applied through a test fixture so that the antennas 118 remains connected to the device, but the test signal is inserted to a particular point near the antennas 118. In yet other examples, the device 110 may be physically modified to enable connection to the cabled connection 130, such as by disassembling the device 110 and physically modifying a circuit board in the device 110. However, this technique may not be desirable to accomplish the connection at the location of the device antennas, which are typically disconnected to prevent radiation and impedance variations when the cabled connection 130 is attached.

The channel emulator 120 includes a channel emulation module as described herein, which provides a controlled lab test environment for emulating network communications with the device 110. The channel emulator 120 provides the ability to simulate radio channel characteristics such as fading, noise, etc. The channel emulator 120 can be, for example, a Spirent SR5500 Wireless Channel Emulator manufactured by Spirent Communications of Rockville, Md., modified as described herein to provide test signals to emulate a wireless channel which incorporate performance characteristics of the antennas 118 of the device 110.

The test signals provided by the channel emulation module running on the channel emulator 120 to the mobile device 110 via cabled connection 130 emulate a wireless channel and incorporate characteristics of the performance of the antennas 118 of the mobile device 110. These characteristics may, for example, be based on actual measured performance of the antennas 118 of the device 110, based on representative models of the antennas 118, based on combinations thereof, as well as a variety of different techniques discussed in more detail below. Since the test signals for the emulated channels are provided through the cabled connection 130 and incorporate representative performance characteristics of the antennas 118 of the device, the device 110 can efficiently be measured over a large set of configurations and underlying conditions.

In the embodiment illustrated in FIG. 1, a single cabled connection 130 is used as the signal feed, such that the composite test signals provided by the channel emulator 120 to the cabled connection 130 incorporate the characteristics of each of the antennas 118 in the mobile device 110. In some alternative embodiments, a plurality of signal feeds are used, with each of the signal feeds being adapted to be coupled to the mobile device 110 at different locations (e.g. different RF ports) to bypass associated antennas in the set of antennas 118 in the device 110. In such a case, test signals are provided by the channel emulator 120 to the individual signal feeds, where the test signal provided to a given signal feed incorporates the characteristics of only the associated antenna.

The system 100 further includes a network emulator 125 to simulate network conditions such as operating bands, air-interface protocols, downlink data rates, uplink data rates, code power, etc. The network emulator 125 can be, for example, a Spirent SR3420 Network Emulator manufactured by Spirent Communications. The system 100 also includes a packet core network emulator 154 to provide the ability to simulate network delay/latency, packet loss, packet jitter, etc. The system 100 further includes an external storage device 180 for archiving captured data, and a router 170. The system 100 can also include a second channel emulator to provide test signals to the cabled connection 130 to support handover testing of the device 110, as described in more detail with respect to FIG. 11.

In embodiments, the system 100 in FIG. 1 can operate in a multiple input multiple output N×M MIMO mode, where N is the number of antennas at the signal source and M is the number of antennas 118 in the mobile device 110. In such a case, the propagation channel model (described below) between the signal source and the mobile device 110 can represent the signal paths between a plurality of antennas at the signal source and the antennas 118 in the mobile device 110. The sub-paths of the signal paths are typically modeled with an angle distribution so that the path will have a particular power-angle spectrum. The effect of the angle distribution results in unique angle differences observed for each sub-path at each antenna in the set of antennas 118. When the sub-paths are combined on each antenna, the resulting signals will be correlated. The correlation is related to the path direction of arrival, the path's power-angle spectrum, and the antenna pattern of each antenna in the set. Received signals having high correlation are less able to support high throughput MIMO techniques and therefore it can be important to evaluate the device performance with specific channel characteristics.

The system 100 also includes a controller computer system 140 to initiate the test, to configure and remotely operate the various elements of the system 100 during the test, and to perform post-test processing of the measured results. The controller computer system 140 executes a computer program for communication and control of the operation of the various devices of the system 100, including configuration and initialization of the data acquisition process. The computer system 140 typically includes a processor subsystem which communicates with a number of peripheral devices via a bus subsystem. These peripheral devices may include a storage subsystem, comprising a memory subsystem and a file storage subsystem, user interface input devices, user interface output devices, and a network interface subsystem. The input and output devices allow user interaction with computer system 140. Network interface subsystem provides an interface to outside networks and devices of the system. Communication network may comprise many interconnected computer systems and communication links. The communication links may be wireline links, optical links, wireless links, or any other mechanisms for communication of information.

The physical hardware component of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system 140.

User interface input devices may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all known types of devices and ways to input information into computer system 140 or onto computer network.

User interface output devices in the computer system 140 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all known types of devices and ways to output information from computer system 140 to the user or to another machine or computer system.

Storage subsystem in the computer system 140 stores basic programming and data constructs that provide the functionality of certain embodiments of the present invention. For example, the various modules implementing the functionality of certain embodiments of the invention may be stored in storage subsystem. These software modules are generally executed by processor subsystem.

Memory subsystem in the computer system 140 typically includes a number of memories including a main random access memory (RAM) for storage of instructions and data during program execution and a read only memory (ROM) in which fixed instructions are stored. File storage subsystem provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem. The host memory contains, among other things, computer instructions which, when executed by the processor subsystem, cause the computer system to operate or perform functions as described herein. As used herein, processes and software that are said to run in or on "the host" or "the computer", execute on the processor subsystem in response to computer instructions and data in the host memory subsystem including any other local or remote storage for such instructions and data.

Bus subsystem in the computer system 140 provides a mechanism for letting the various components and subsystems of computer system 140 communicate with each other as intended. Computer system 140 itself can be of varying types including a personal computer, a portable computer, a workstation, a computer terminal, a network computer, a television, a mainframe, or any other data processing system or user device. Due to the ever changing nature of computers and networks, the description of computer system 140 depicted in FIG. 1 is intended only as a specific example for the purposes of illustrating embodiments. Many other configurations of computer system 140 are possible having more or less components than that description above.

Figure 2:
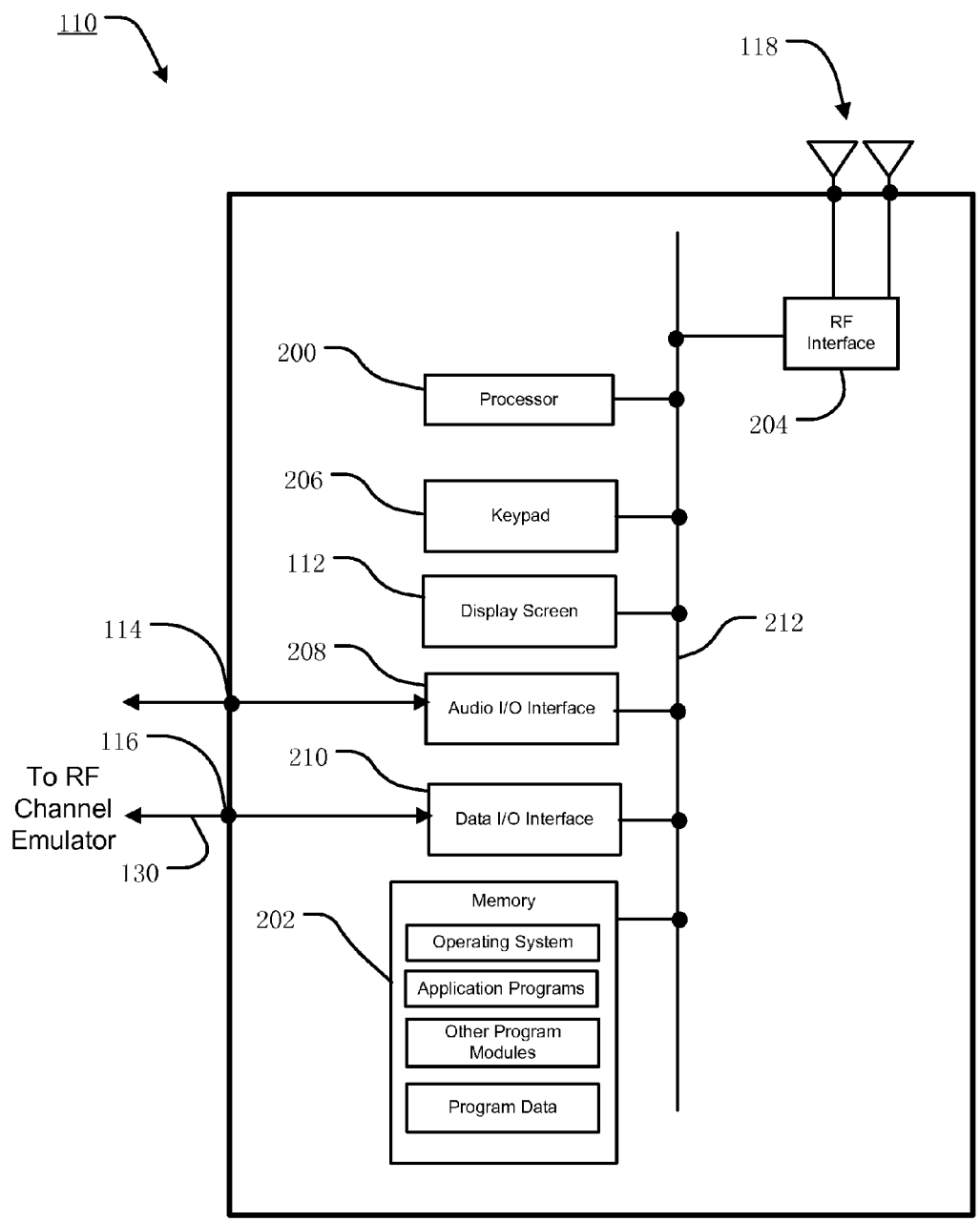
FIG. 2 is a simplified functional block diagram of an example of the mobile device.

FIG. 2 is a simplified functional block diagram of an example of the mobile device 110. As shown in FIG. 2, the mobile device 110 includes a processor 200, memory 202, an RF interface 204 with RF antennas 118, a keypad 206, a display screen 112, an audio I/O interface 208 with audio port 114, and a data I/O interface 210 with RF port 116, which is coupled to the antennas 118 and RF section of the radio. Processor 200 includes one or more processing units, such as general microprocessors and/or dedicated processors. Memory 202 contains instructions executable by the processor 200 to carry out various functions described herein, such as to take various actions in response received control commands from the controller computer system 140. Keypad 206 enables a user to enter functional commands to the mobile device 110, such as a command to initiate a communication via the RF port 116. The keypad 206 may be integrated with display screen 112 as a touch-sensitive keypad, for example. Display screen 112, such as an LCD display screen or the like, is arranged to display text and video pursuant to instructions.

Audio I/O interface 208 provides for transmission of audio signals out of the mobile device 110 via an audio port 114. Audio port 114 of the audio I/O interface 208 may be designed, for example, to connect with a conventional headset. Data I/O interface 210 provides for data into and out of the mobile device 110 via RF port 116. In some arrangements, the data I/O interface 210 may provide for audio transmissions as well, instead of or in addition to the audio I/O interface 208. Although not shown, the mobile device 110 may also have other I/O ports as well as other components.

Figure 3:
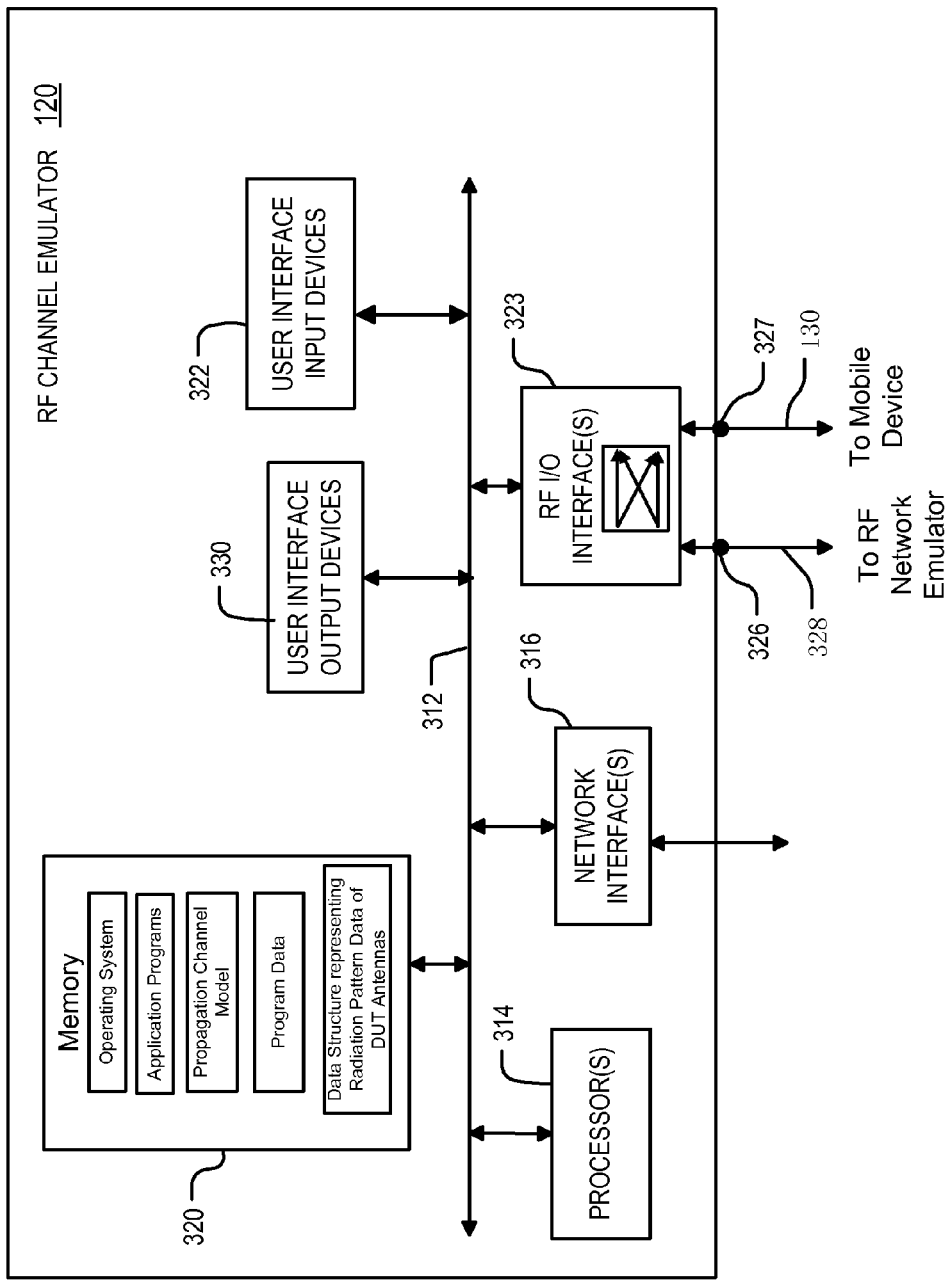
FIG. 3 is a simplified block diagram of an embodiment of the channel emulator suitable for providing test signals to emulate a wireless channel and incorporate performance characteristics of the antennas of the mobile device.

FIG. 3 is a simplified block diagram an embodiment of the channel emulator 120 suitable for providing test signals to emulate a wireless channel and incorporate performance characteristics of the antennas 118 of the device 110. The channel emulator 120 includes at least one processor 314 which communicates with a number of peripheral devices via bus subsystem 312. These peripheral devices include memory 320, user interface input devices 322, user interface output devices 322, a network interface subsystem 316, and RF I/O interface subsystem 323. The input and output devices 322, 330 allow user interaction with the channel emulator 120. Network interface subsystem 316 provides an interface to outside networks, including an interface to a communication network, and is coupled via the communication network to corresponding interface devices in other computer systems.

User interface input devices 322 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to accommodate all known types of devices and ways to input information into the channel emulator 120.

User output devices 330 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices.

In general, use of the term "output device" is intended to include all known types of devices and ways to output information from the channel emulator 120 to the user or to another machine or computer system.

The RF I/O interface subsystem 323 includes transmitter/receiver circuitry including modulators and demodulators for receiving radio frequency signals on cable 328 output from the RF Network Emulator 125 via RF Input ports 326, and for transmitting radio frequency signals on the cabled connection 130 via RF Output ports 327. The channel emulator 120 has an RF input port for each of the antennas of the emulated base station provided by the RF Network Emulator 125, and has an RF output port for each antenna in the mobile device 110. So for an emulated base station having two antennas and two antennas in the mobile device, there are two RF Input ports 326 and two RF Output ports 327. This is represented by the cross-connection illustrated in the RF I/O Interfaces 323 block in FIG. 3.

The nonvolatile memory 320 stores data associated with various functions that can be carried out by the channel emulator 120. The nonvolatile memory 320 also stores computer programs and configuration data for controlling the channel emulator 120. The programs are executable by the processor 314, and include instructions to carry out the various functions including the channel emulation module described herein.

The nonvolatile memory 320 also stores a data structure for a set of variables representing radiation pattern data of the antennas 118 of the mobile device 110. In addition, the nonvolatile memory 320 stores a data structure for variables of one or more propagation channel models representing amplitude, phase, and angle of arrival of one or more signal paths between a signal source and the mobile device 110. The data structures are used by the channel emulation module computer programs to generate the test signals which are then provided to the cabled connection 130 to emulate a wireless channel and incorporate characteristics of the performance of the antennas 118 of the mobile device 110.

The nonvolatile memory 320 also stores parameters including an angular orientation parameter (described below) that relates the radiation pattern data of individual antennas 118 in the data structure to the angle of arrival of the respective signal paths in the propagation channel model.

The propagation channel models stored in memory 320 may be based on predefined channel models, such as standardized models. Recorded signals obtained from channel measurements can also be used. The variables stored in memory 320 will depend upon the specific propagation channel models used, and will vary from embodiment to embodiment.

Modern radio systems use different technologies including for example spread spectrum techniques such as wide-band code division multiple access (WCDMA), and orthogonal frequency division multiple access (OFDMA). These two techniques are significantly different in the way they process the received signal, leading to differences in how the wireless RF channel is modeled and how the test signals are generated.

For spread spectrum systems the multi-path radio channel can be modeled as a series of delayed copies of the signal. Each delayed copy that is resolvable within the radio bandwidth is called a path. Each path is detected and may be processed or combined in a manner determined by the design of the receiver. Thus for this type of air interface, the path is carefully specified to allow multiple antenna processing to be correctly emulated.

OFDM systems rely on the data being encoded and transmitted in a series of narrow band sub-carriers spaced across the operating bandwidth of the channel. As such, the signals are inherently narrow band, and are not able to distinguish the individual paths that are modeled for the spread spectrum systems. Rather, the channel is modeled as the composite of all signal paths. Thus the spatial channel effects with be observed using all paths in combination, and result in higher angle spread values. The wide-band effects of the multi-path channel will be observed as frequency selective fading across the band affecting each sub-carrier, although the individual paths will not be distinguishable. Even through the individual clusters are not resolvable, it can still be important to model them precisely in order to achieve the correct dynamic fading behaviors of each sub-carrier, which results from the cluster signal interaction.

In standardized models, paths are defined as a signal arriving from a certain direction and having an azimuth spread representing a mean and a sigma. An average elevation angle and elevation spread may also be used which give a second mean and sigma representing the signal.

Paths may be characterized by discrete or continuous distributions. The Spatial Channel Model (SCM) uses a discrete representation using 20 equal powered sub-paths to represent each path. The sub-paths are distributed in angle with a non-linear spacing to emulate a Laplacian distribution, although some models use other distributions such as Gaussian.

The received signal is usually made of multiple late arriving copies of the signal with powers that are typically decreasing exponentially with increased delay time. This is described by the ITU Vehicular A model, which is one of many different models to describe the signal's multipath power delay profile.

Figure 4:
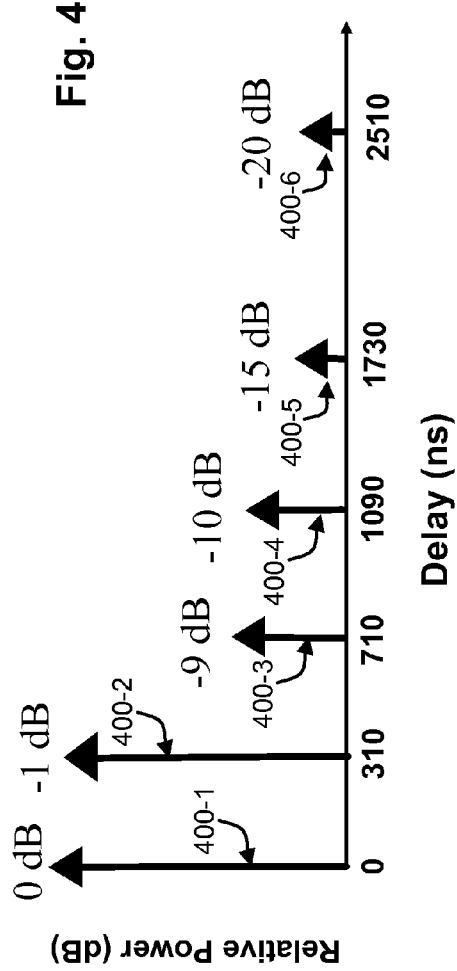
FIG. 4 is one example of the power delay profile of a propagation channel model.

FIG. 4 is one example of the power delay profile relative to the power in path 400-1 and shows six paths (labeled 400-1 to 400-6) for this propagation channel model, although more typically there will be 4-20 paths in most models. There will also be different models for Urban, Suburban, and Rural Environments. Each path 400-1 to 400-6 will also have a spatial aspect which is modeled by an angle of departure (AoD) and an angle of arrival (AoA) for a given transmit and receive path.

Figure 5:
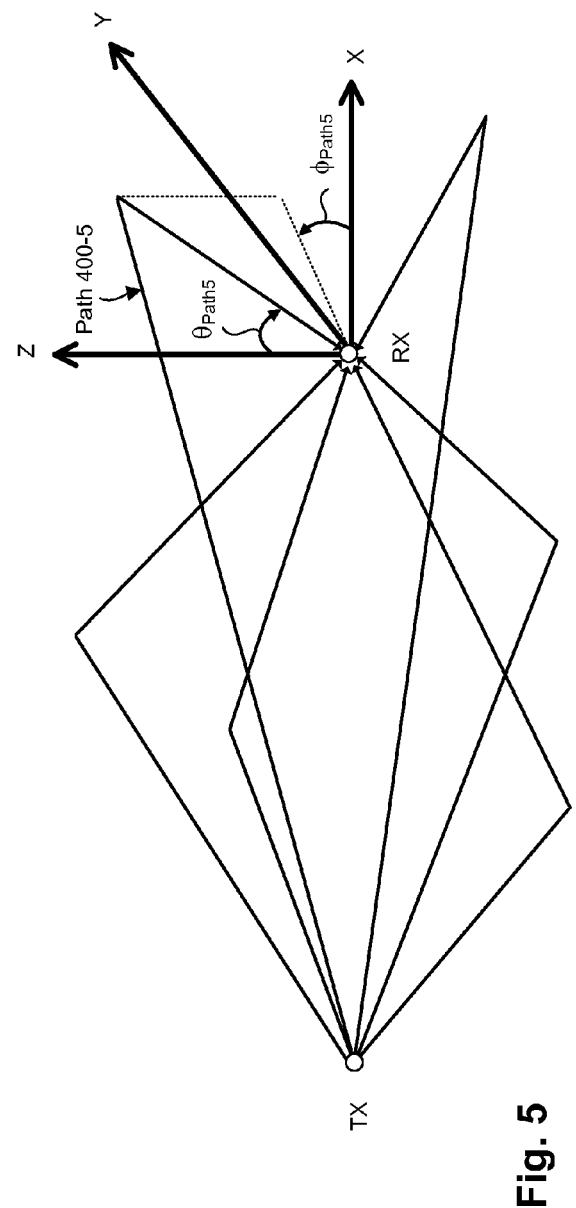
FIG. 5 is a top view illustration of an example spatial propagation channel model.

FIG. 5 is a top view illustration of an example spatial propagation channel model showing the paths 400-1 to 400-6. In FIG. 5 a base station (TX) at the left is transmitting a signal to the mobile device (RX) on the right. Each path 200-1 to 200-6 leaves the base station at a particular AoD and arrives at the mobile device at a particular AoA. The AoA for each path 400-1 to 400-6 can be represented for example as an azimuth angle $\phi_{Pathi}$ and an elevation angle $\Theta_{Pathi}$, as shown in FIG. 5 for path 400-5. In this model, each path is a virtual path, such that the AoD and AoA are specified, but the path is not required to take any particular course between the transmitter and receiver. The paths can have a predefined delay and an arbitrary phase, and will vary from embodiment to embodiment. The phase of the paths results from the combination of sub-paths of each path after being acted on by the antenna pattern and the antenna phase response.

The probability distribution function (PDF) of the departure signal will follow a Gaussian with a sigma measured in degrees and a mean value equal to the line of sight (LOS) direction. The power azimuth spectrum (PAS) is a power weighted angle spread that generally results in a Laplacian distribution (exponential in power versus angle, but linear in dB versus angle) when averaged over many channel realizations.

The AoA model for the SCM is a function of the relative power of each path, where a random angle is drawn from a Gaussian distribution with a sigma that is a function of relative power. Other models can be used as well.

Path angle spreads vary from embodiment to embodiment. Although some models may use 35 degrees and other models may use 10 or 15 degrees, it is actually a distribution. This is shown in the plot from 3GPP standards Document TSGR1 #24 (02) 0408, showing the angle spread of the strongest received path. There is a tendency for weaker and higher delayed paths to have increased angle spread because they typically see more environmental scattering than the strong paths, which are more direct and experience less scattering.

Figure 6:
FIG. 6 is an example elevation angle of arrival.

FIG. 6 is an example elevation angle of arrival specified by a log normal distribution with σ=0.17 degrees and μ=1.1 degrees, i.e. Angle=0.17*N(0,1)+1.1, as specified by the Winner-II model. The angle spread for this case is a Gaussian with σ=3 degrees. Other values are used for different environmental assumptions.

FIG. 7 is a table showing an example of the data structure for a propagation channel model stored in memory 320. As shown in the table in FIG. 7, the data structure for each path i from 1 to N includes variables for path amplitude $A_{Pathi}$, path phase $P_{Pathi}$, and path angle of arrival $\theta_{Pathi}$, $\phi_{Pathi}$. In embodiments the amplitude, phase and angle of arrival of the signal paths in the data structure can include temporal and spatial characteristics, so that the channel characteristics are dynamically varied during testing, to emulate for example the spatial movement of the mobile device 110 relative to a signal source. For example, the spatial movement can include applying a Doppler spectrum to the test signals based on a virtual spatial movement parameter stored in memory 320. In such a case a Doppler shift can be applied to each of the sub-path sinusoids which make up a path to define a Doppler spectrum. The virtual spatial movement parameter represents spatial movement of the mobile device 110 relative the emulated signal source. For example, the virtual spatial movement parameter may include a velocity indication with speed and direction, and may include the specification of Doppler shifts for particular sub-paths. For the purposes of modeling, the Doppler applied to a particular sub-path may be set independently from the geometric relationships normally associated with the Doppler frequency.

Figures 8, 9:
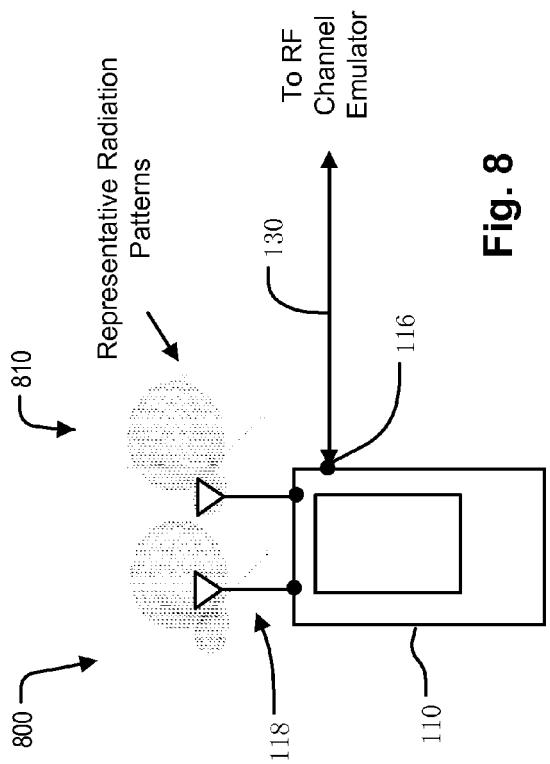
FIG. 8 illustrates one example of representative radiation patterns of the antennas of the mobile device.
FIG. 9 is a table showing an example of the data structure stored in memory for a set of variables representing radiation pattern data of the antennas in the mobile device.

FIG. 8 illustrates one example of radiation pattern data of the antennas of the mobile device 110. In the example in FIG. 8 the wireless device 110 has two antennas having respective patterns 800 and 810. More generally, the wireless device 110 may have two or more antennas, each having a different radiation pattern.

FIG. 9 is a table showing an example of the data structure stored in memory 320 for a set of variables representing radiation pattern data of the antennas 118 in the mobile device 110. As shown in the table in FIG. 9, the data structure for each antenna ANTi from 1 to J in the mobile device 110 includes an amplitude A and a phase P versus angle θ, φ, where J is the number of antennas in the mobile device 110. It should be noted that the geometry of the physical locations of the antennas 118 in the mobile device 110 are part of the phase P, so that in embodiments it may not be necessary to specify the physical locations of the antennas 118 in the mobile device 110. An offset in the mobile device (the electrical phase center) from the center of the table does produce a phase error when the signal source is not sufficiently far away, and if desired can be corrected for mathematically by modifying the phase response of the phase values P in the table.

The variables in the data structure representing radiation pattern data of the antennas 118 in the mobile device may be based on actual measured performance of the antennas 118, be based on representative models, and based on combinations thereof.

Various techniques can be used to measure a variety of performance characteristics of the antennas, some of which are mentioned below.

These measurements may include detailed 2d or 3d radiation patterns for each antenna 118 in the device 110. The patterns will typically be unique to each antenna and vary with frequency, proximity to external obstructions such as phantom objects (e.g. simulated human), and the antennas placement inside the device 110. The pattern can be measured in quantized angles with Azimuth varying from −pi to pi, and elevation from −pi to pi for example, or a subset may be used. Different quantization step sizes may also be used depending on the resolution that is desired. Generally the more complex the patterns, the more sampling needed.

The antenna patterns can be measured using standard techniques in the art and may include measurements in an anechoic chamber where the gain and phase are measured in azimuth and elevation. These may be quantized to a certain angle step size, such as for example 15 degrees or 30 degrees, or whatever may be desired.

Measurements may be made with vertical polarization and horizontal polarization. The combination of vertical and horizontal polarization measurements will result in the total polarization result for each measurement.

Parameters such as Total Radiated Sensitivity (TRS), Total Isotropic Sensitivity (TIS), Total Radiated Power (TRP) may be used to calculate the overall performance of the antenna and may be expressed as an antenna gain value. The antenna gain may be used for scaling the pattern to adjust the resulting gain to other values.

Measurements of the antenna can be made across multiple frequencies across the band of interest. After measurement, other frequencies may be obtained by interpolating the results. Interpolation may be used to obtain values that are in between measured values. This may include amplitude, phase and polarization. In addition to interpolation between frequencies, interpolation can also be made between measurement angles. For example, measurement amplitudes that fall between two different measured angles may be interpolated. Phases that fall between two different measured angles may also be interpolated.

The antenna measurement procedure may include calibrating the path loss in the anechoic chamber to the location of the device under test using a calibrated antenna as known in the art. The transmit and receive power may be measured and adjusted for path loss to obtain a gain value for each of the antennas for each azimuth, elevation and polarization. A similar calibration procedure may be implemented using cabled connections to the device 110 to adjust the virtual antenna gains at the various frequencies, elevations, and angles, to be consistent with the performance of the device when the antennas were measured without the cables.

The antenna measurement may be done using a power measurement, or a vector voltage measurement that includes amplitude and phase. The measurement of the device antennas may be done within the receiver wherein the measured values are stored in the device memory for later retrieval. This technique eliminates external cabling which may affect the measurements. As noted above, the measurements of the antennas may include proximity effects such as a phantom hand.

Figure 10:
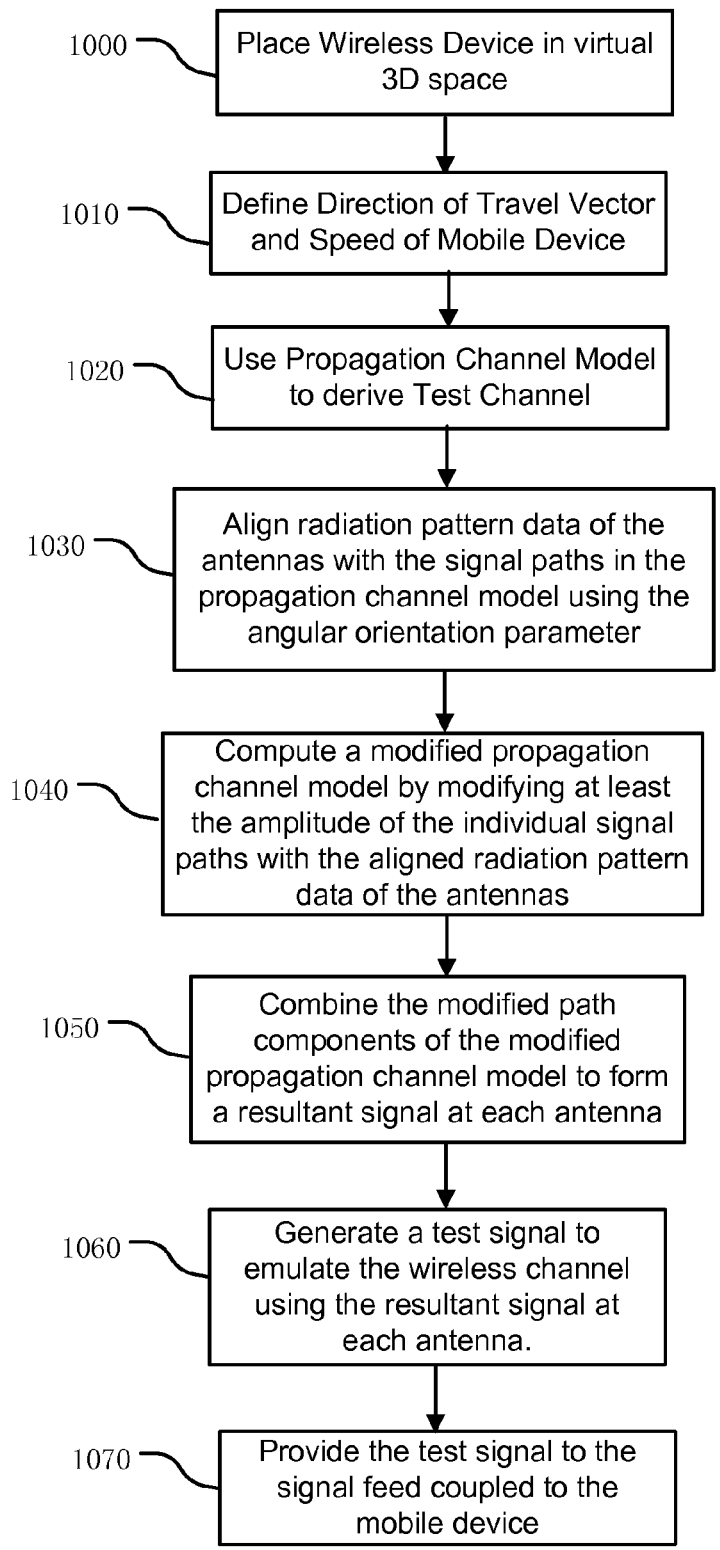
FIG. 10 is a flow diagram of an embodiment of a process carried out by the channel emulation module running on the channel emulator for computing and providing the test signals to the mobile device through the cabled connection.

FIG. 10 is a flow diagram of an embodiment of a process carried out by the channel emulation module running on the channel emulator 120 for computing and providing the test signals to the mobile device 110 through the cabled connection 130. The test signals emulate a wireless channel between a signal source and the mobile device 110, and incorporate performance characteristics of the antennas 118.

At block 1000 the mobile device 110 is oriented in a virtual 3d space expressed in a first coordinate system $(x_1, y_1, z_1)$. Next, at block 1110 a virtual drive test including a direction of travel vector and speed of the mobile device 110 in the virtual 3d space is defined. This could be a varied trajectory, including varying the orientation of the mobile device 110.

At block 1020 the propagation channel model stored in memory 320 is used to derive the virtual drive test channel for the mobile device 110 in the virtual 3d space. As described above, this propagation channel model may be, for example, a predefined channel model, or as another example may be based on recorded signals obtained from channel measurements during an actual drive test. The derivation of block 1020 can include, for example, the number of arriving paths, power and delay of each arriving path, polarization orientation of each arriving path, polarization phase between orthogonal components (e.g. slant, elliptical, circular, etc.), azimuth and elevation of each arriving path, azimuth and elevation spread of each arriving path, and path component details for each path (such as those above) at each time instant over the virtual path.

At block 1030 the radiation pattern data of the antennas 118 of the mobile device 110, which are typically expressed in a second coordinate system $(x_2, y_2, z_2)$, are aligned with the signal paths the propagation channel model, which are expressed in the first coordinate system $(x_1, y_1, z_1)$ of the virtual 3d space, using the angular orientation parameter stored in memory 320. The angular orientation parameter is an offset which relates the first coordinate system $(x_1, y_1, z_1)$ of the virtual 3d space to the second coordinate system $(x_2, y_2, z_2)$. In embodiments the angular orientation parameter can be a null set, indicating that the first coordinate system $(x_1, y_1, z_1)$ and the second coordinate system $(x_2, y_2, z_2)$ are exactly aligned.

At block 1040 the path characteristics of the individual signal paths are modified by the aligned radiation pattern data of the antennas 118 at the angle of arrival at the individual signal paths over the virtual path to compute a modified propagation channel model, so that these modified signal path characteristics incorporate the characteristics of the performance of the antennas 118. Computing the modified signal path characteristics includes modifying at least the amplitude of the individual signal paths with the aligned radiation pattern data of the individual antennas 118 at the angle of arrival of the individual signal paths. In embodiments this can also include modifying the phase of individual signal paths with the aligned radiation pattern data of the individual antennas of the mobile device 110 at the angle of arrival of the individual signal paths.

At block 1050 the modified path components of the modified propagation channel model are combined to form a resultant signal at each antenna over the virtual path. Next, at block 1060 the channel emulator 120 generates the test signal to emulate the wireless channel using the resultant signal at each antenna. At block 1070 the channel emulator 120 provides the test signal to the mobile device 110 through the cabled connection 130 which bypasses the actual physical antennas 118.

In some embodiments a plurality of signal feeds are adapted to be coupled to the mobile device 110 at different locations on the device 110 to bypass associated antennas in the set of antennas 118. In such a case, generating the test signal at block 1060 includes generating corresponding test signals for individual antennas in the mobile device 110 using the modified propagation channel model, and providing the test signal includes providing the corresponding test signals for the individual antennas to the associated signal feeds. In yet other embodiments, a single signal feed is used, and the test signal is a composite of the resultant signals at each antenna.

It will be understood that various embodiments can include different types of testing conditions and configurations. Some of these are described below.

As noted above, the data structure representing radiation pattern data of individual antennas in the set may incorporate proximity effects of the mobile device 110 to external objects such as a phantom hand. In yet other embodiments, the data structure represents unperturbed antenna patterns of the mobile device 110, which then may be modified during the channel emulation to emulate proximity of the mobile device 110 to external objects using an algorithm.

A statistical model can be used to model the degradation of the antennas based on the change in gain and phase of the antennas and may include the simulation of a fixed or moving absorber.

The test signals can be modeled to include temporal and spatial characteristics. Also, interference sources, which may for example be other base stations or other mobile devices, may also be modeled by providing spatial and temporal interference characteristics, so that the mobile device 110 may see the full spatial and temporal channel including both desired and interference signals.

The power of the desired signal transmitted through the cabled connection 130 may be controlled via a radio operation which measures the received signal at the mobile device 110 during the test, and transmits a measurement report based on standardized open and/or closed loop power control algorithms.

The operation of the cabled test using spatio-temporal channels to the mobile device with multiple antennas, may include the transmission of multiple streams in response to the channel characteristics. The multiple streams are an advanced method of transmission using MIMO (multiple-input multiple-output), which are characterized by multiple antennas on each end of the link. Other advanced antenna schemes can include spatial multiplexing, space-time coding, dual stream transmit antenna arrays, beam forming, optimum combining, diversity combining, and other known schemes.

The mobile device testing using the cabled connection 130 may be evaluated over a virtual path, which includes changes in propagation characteristics such as: shadow fading, spatial channel characteristics, delay spread changes, angle spread changes, path power changes, path delay changes, path angle changes, polarization changes including the changes from linear to circular or slant or elliptical polarization.

Polarization can be modeled by a covariance matrix to modify a correlation matrix used to model the spatial channel.

The virtual path can include changes to the channel but also can include changes in handset speed, direction of travel, modeling of objects, the effects of the body, or absorbers moving with respect to the device. The moving absorbers can affect the received signal power and phase according to an algorithm which may be stored in memory. The algorithm can be characterized by the location of the absorber so that paths between the signal source and the receiver and through the absorber is absorbed by an amount based on the thickness of the absorber, along with a corresponding phase shift which is based on the amount of signal attenuation or the thickness of the absorber. One such application for the moving blocker is to model a fixed receiver that is affected by a person or object that passes near by.

The virtual path simulation may also include interfering signals and/or signals from multiple simulated base stations using a system which includes more than one channel emulator as described herein. The interfering signals may change in response to the simulated mobile device movement. The mobile device may approach the interfering signal to the point where is becomes larger than the current desired signal, where the mobile device will then be handed off from one desired serving signal to a different serving signal. An additional aspect of the virtual drive test is the changing signal conditions which may include signals from multiple simulated base stations, where a location estimate is also made.

Figure 11:
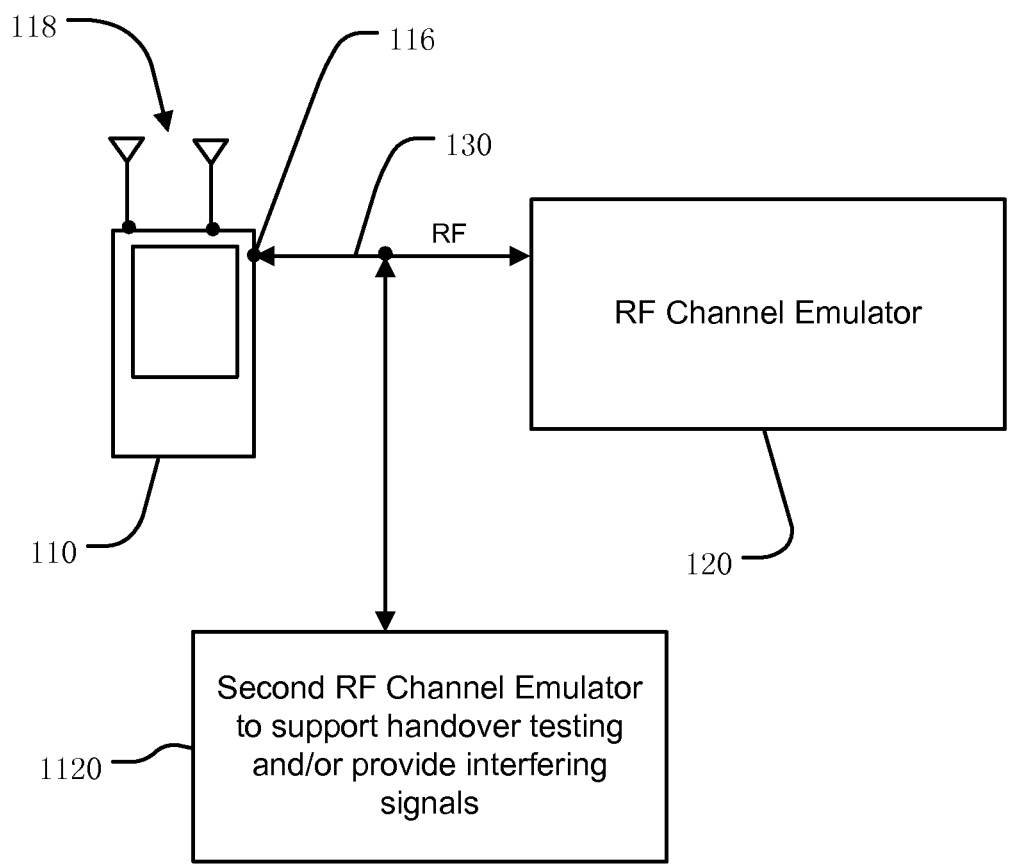
FIG. 11 is a simplified block diagram of a lab based system which includes a second channel emulator to support handover testing to a second emulated base station, and/or to provide interfering signals.

FIG. 11 is a simplified block diagram of a lab based system 1100 which includes a second channel emulator 1120 coupled to the cabled connection 130 to deliver test signals to the mobile device 110 to support handover testing to a second emulated base station, and/or to provide interfering signals. The second channel emulator 1120 provides a controlled lab test environment for emulating network communications with the device 110. The second channel emulator 1120 is adapted to operate similar to that of the channel emulator 120 of FIG. 1 discussed above, and thus a detailed description is not repeated here. To support handover testing and/or interference testing the respective test signals from the channel emulators 120, 1120 can be provided for an overlapping period of time.

In FIG. 11 the signals provided by the first and second channel emulators 120, 1120 are combined using an RF combiner. Alternative techniques for combining the signals may also be used. For example, the signals may be combined internally within the channel emulators.

Another aspect of the virtual drive test is the type of data that is sent, where the data can be based on a traffic model representing one or many possible use cases and may be correlated to the simulated speed or location or presence of blockers or phantoms.

The full air interface specification for one or more cellular telephony standards may be operated with the cabled test and include handoff testing between different radio access technologies (RATS) or the measurement of one by the other.

The mobile device may support additional features, such as GPS, Wireless LAN, Bluetooth, music players, video projectors, etc. These features may be controlled during the test to become active, and transmit and receive signals to support the given test.

The test of the mobile device can include setting up a call, transferring data, physical layer control functions such as power control, etc.

The representative radiation pattern data of the individual antennas in the data structure may incorporate representative aspects of the test setup, such as incorporating connectors and cable losses, imbalanced cables, antenna coupling, along with simulated positioning near a bracket or holder, as well as the simulation of users and user behavior. Alternatively, these aspects of the test setup can be incorporated for example by modifying the characteristics of the signal paths in the propagation channel model during testing.

As noted above, if measured radiation pattern data of the antennas are not available, predetermined radiation pattern data may be used for evaluating the mobile device performance. This may be a standardized pattern (for example approved by a standards organization) or a pattern from another handset that is assumed to represent the characteristics of the antennas of the mobile device. Selection of various predetermined patterns could allow patterns to match the type of antennas and hardware configurations used, such as antennas mounted at particular positions in the mobile device, certain types of antennas, certain types of mobile devices such as flip phones, brick styled phones, etc.

The playback of the virtual drive test may be controlled by the performance level of the mobile device under test, such that signals, speeds, and locations associated with the virtual drive test may be played back, restarted, or retested so that handset performance problems can be identified. The virtual drive test may be used in conjunction with off-the-shelf data logging tools (such as QXDM) that log handset signal reception, messaging, physical layer tracers, such as the powers, etc. The virtual drive test may be synchronized to the data logging software and used to analyze the call performance and establish root causes for particular problems.

A separate model may be used to model electrically tunable antennas. This model consists of multiple measurements at different tuned parameters. Then different parameters are used in order to simulate the given response for that tuned value. Statistical or deterministic models may also be used for this purpose.

As will be understood, some of the methods and techniques described herein may be implemented in software stored in memory and executed by a general purpose computer and/or by the channel emulator as described herein.

Aspects of the present invention may be practiced as a method or device adapted to practice the method. The invention may be an article of manufacture such as a media impressed with logic to carry out the sets of the method when executed by a processor.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. Computer-assisted processing may be used to implement the described embodiments. Accordingly, the present invention may be embodied in methods for performing the specified steps, systems including logic and resources to carry out the specified steps, media impressed with logic to carry out the specified steps, data streams impressed with logic to carry out the specified steps, or computer-accessible services that carry out the specified steps.

What is claimed is:

1. A system for testing a mobile device having a set of two or more antennas, the system comprising:
   memory storing representative radiation pattern data of individual antennas in the set, and storing a propagation channel model representing amplitude and angle of arrival of one or more signal paths between a signal source and the mobile device;
   a channel emulator comprising one or more processors and storing instructions executable by the processors including instructions that cause the channel emulator to:
      compute a modified propagation channel model, comprising modifying at least the amplitude of the individual signal paths using the radiation pattern data and an angular orientation parameter that relates the radiation pattern data of individual antennas in the set to the angle of arrival of the respective signal paths; and
      generate a test signal to emulate a wireless channel between the signal source and the mobile device using the modified propagation channel model.

2. The system of claim 1, wherein the representative radiation pattern data for the antennas in the set is based on measured data of the antennas in the set.

3. The system of claim 1, wherein the representative radiation pattern data for the antennas in the set is based on a representative model of the antennas in the set.

4. The system of claim 1, wherein said instructions that cause the channel emulator to compute the modified propagation channel model further comprises instructions that cause the channel emulator to modify the phase of individual signal paths at the angle of arrival of said individual signal paths.

5. The system of claim 1, wherein said instructions to compute the modified propagation channel model further comprises instructions that cause the channel emulator to modify the signal paths to emulate spatial movement of the mobile device relative to the signal source.

6. The system of claim 5, wherein said instructions that cause the channel emulator to modify the signal paths to emulate spatial movement includes instructions that cause the channel emulator to apply a Doppler spectrum based on a virtual spatial movement parameter that represents spatial movement of the mobile device relative to the signal source.

7. The system of claim 1, wherein said memory further stores a second propagation channel model representing amplitude and angle of arrival of one or more second signal paths between a second signal source and the mobile device, the second signal source non-co-located with said signal source; and further comprising a second channel emulator coupled to the memory, the second channel emulator comprising one or more processors and storing instructions executable by the processors including instructions that cause the second channel emulator to:
to compute a second modified propagation channel model, comprising modifying at least the amplitude of individual second signal paths using the radiation pattern data and a second angular orientation parameter; and
generate a second test signal to emulate a second wireless channel between the signal source and the mobile device using the second modified propagation channel model.

8. The system of claim 7, wherein the second channel emulator further stores instructions that cause the second channel emulator to provide the second test signal to a signal feed to emulate handover of the mobile device between first and second base stations.

9. The system of claim 7, wherein the second channel emulator further stores instructions that cause the second channel emulator to provide the second test signal to a signal feed to emulate an interference source.

10. The system of claim 7, wherein said test signal and second test signal are provided for an overlapping period of time.

11. The system of claim 1, further comprising a test controller coupled to the channel emulator and the mobile device, for controlling operation of the channel emulator and the mobile device.

12. The system of claim 1, wherein instructions that cause the channel emulator to compute the modified propagation channel model includes instructions that cause the channel emulator to modify the signal paths to emulate proximity of the mobile device to external objects.

13. The system of claim 1, wherein the representative radiation pattern data stored in memory for the antennas in the set is based on measured data of the antennas in the set and includes proximity of the mobile device to external objects.

14. The system of claim 1, wherein the amplitude and angle of arrival of the signal paths in the propagation channel model represent time-varying physical relationships between the signal source and the mobile device.

15. The system of claim 1, wherein:
signal paths in the propagation channel model each comprise an associated plurality of signal sub-paths, the signal sub-paths representing sub-path amplitude, sub-path phase, and sub-path angle of arrival between the signal source and the mobile device; and
the channel emulator further including instructions that cause the channel emulator to:
compute modified sub-path component values, comprising modifying at least the sub-path amplitude of individual signal sub-paths using the radiation pattern data and an angular orientation parameter that relates the radiation pattern data of individual antennas in the set to the angle of arrival of the respective sub-paths; and
sum the modified sub-path component values of the sub-paths associated with a given signal path to compute the signal paths in the modified propagation channel model.

16. The system of claim 1, wherein the propagation channel model represents the signal paths between a plurality of antennas at the signal source and the mobile device, wherein the signal paths are correlated in dependence upon antenna characteristics of the mobile device antennas.

17. A method for generating a test for a mobile device having a set of two or more antennas using one or more channel emulators including, the method comprising:
storing representative radiation pattern data of individual antennas in the set, and storing a propagation channel model representing amplitude and angle of arrival of one or more signal paths between a signal source and the mobile device;
computing a modified propagation channel model, comprising modifying at least the amplitude of the individual signal paths using the radiation pattern data and an angular orientation parameter that relates the radiation pattern data of individual antennas in the set to the angle of arrival of the respective signal paths; and
generating a test signal to emulate a wireless channel between the signal source and the mobile device using the modified propagation channel model.

18. The method of claim 17, wherein the representative radiation pattern data for the antennas in the set is based on measured data of the antennas in the set.

19. The method of claim 17, wherein the representative radiation pattern data for the antennas in the set is based on a representative model of the antennas in the set.

20. The method of claim 17, wherein computing the modified propagation channel model further comprises modifying the phase of individual signal paths at the angle of arrival of said individual signal paths.

21. The method of claim 17, wherein computing the modified propagation channel model further comprises modifying the signal paths to emulate spatial movement of the mobile device relative to the signal source.

22. The method of claim 21, wherein modifying the signal paths to emulate spatial movement includes applying a Doppler spectrum based on a virtual spatial movement parameter that represents spatial movement of the mobile device relative to the signal source.

23. The method of claim 17, wherein said conducting a test further comprises:
storing a second propagation channel model representing amplitude, phase, and angle of arrival of one or more second signal paths between a second signal source and the mobile device:
computing a second modified propagation channel model, comprising modifying at least the amplitude of individual second signal paths using radiation pattern data and a second angular orientation parameter; and generating a second test signal to emulate a second wireless channel between the signal source and the mobile device using the second modified propagation channel model.

24. The method of claim 23, wherein said conducting a test further comprises providing the second test signal to a signal feed to emulate handover of the mobile device between first and second base stations.

25. The method of claim 23, wherein said conducting a test further comprises providing the second test signal to the signal feed to emulate an interference source.

26. The method of claim 23, wherein said test signal and second test signal are provided for an overlapping period of time.

27. The method of claim 23, further comprising coupling a test controller to the channel emulator and the mobile device, for controlling operation of channel emulator and the mobile device.

28. The method of claim 17, wherein computing the modified propagation channel model includes modifying the signal paths to emulate proximity of the mobile device to external objects.

29. The method of claim 17, wherein the representative radiation pattern data for the antennas in the set is based on measured data of the antennas in the set and includes proximity of the mobile device to external objects.

30. The method of claim 17, wherein the amplitude and angle of arrival of the signal paths in the propagation channel model represent time-varying physical relationships between the signal source and the mobile device.

31. The method of claim 17, wherein:

signal paths in the propagation channel model each comprise an associated plurality of signal sub-paths, the signal sub-paths representing sub-path amplitude, sub-path phase, and sub-path angle of arrival between the signal source and the mobile device; and further comprising:

computing modified sub-path component values, comprising modifying at least the sub-path amplitude of individual signal sub-paths using the radiation pattern data and an angular parameter that related the radiation pattern data of individual antennas in the set to the angle of arrival of the respective sub-paths; and summing the modified sub-path component values of the sub-paths associated with a given signal path to compute the signal paths in the modified propagation channel model.

* * * * *